United States Patent Office 3,508,524
Patented Apr. 28, 1970

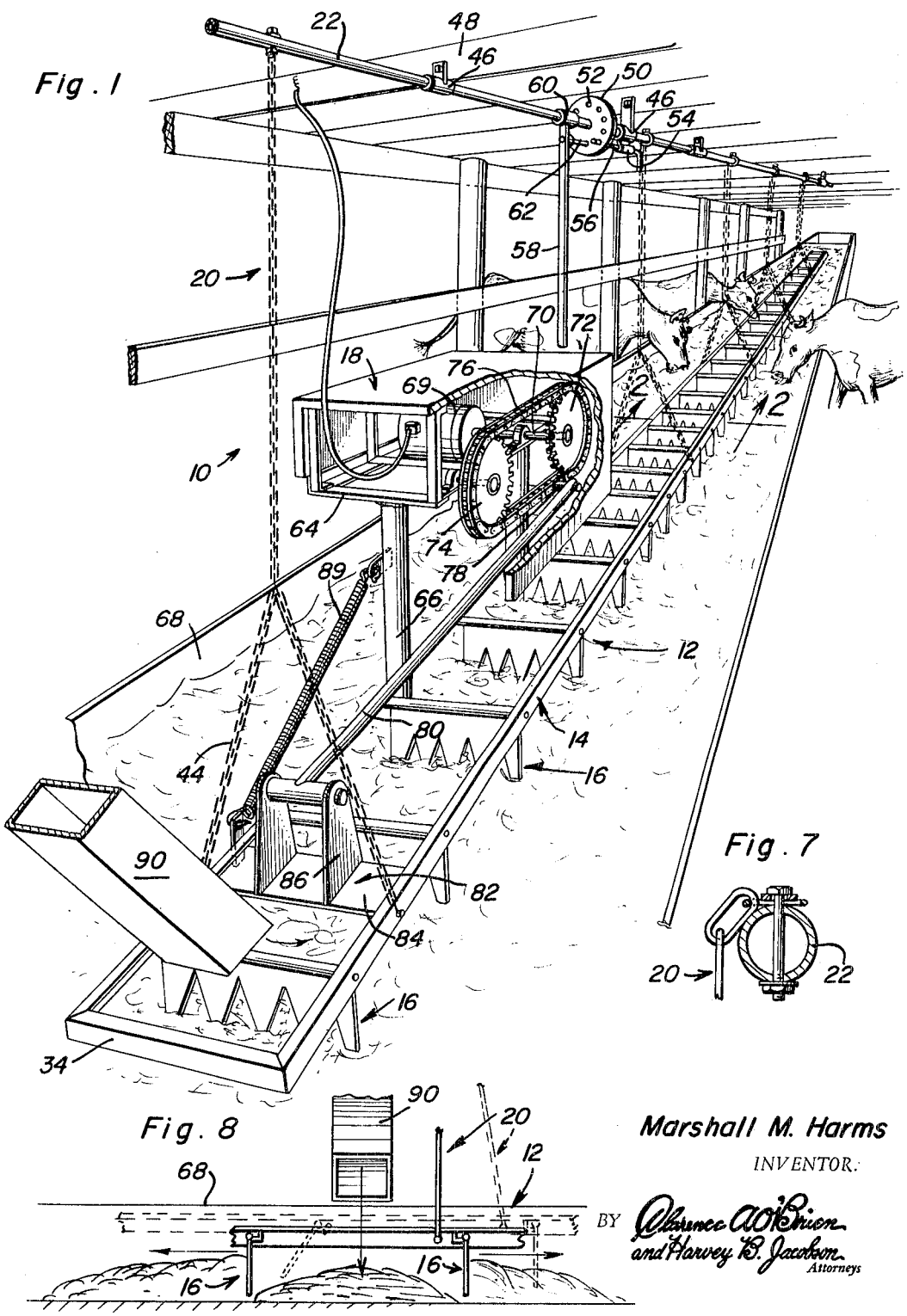

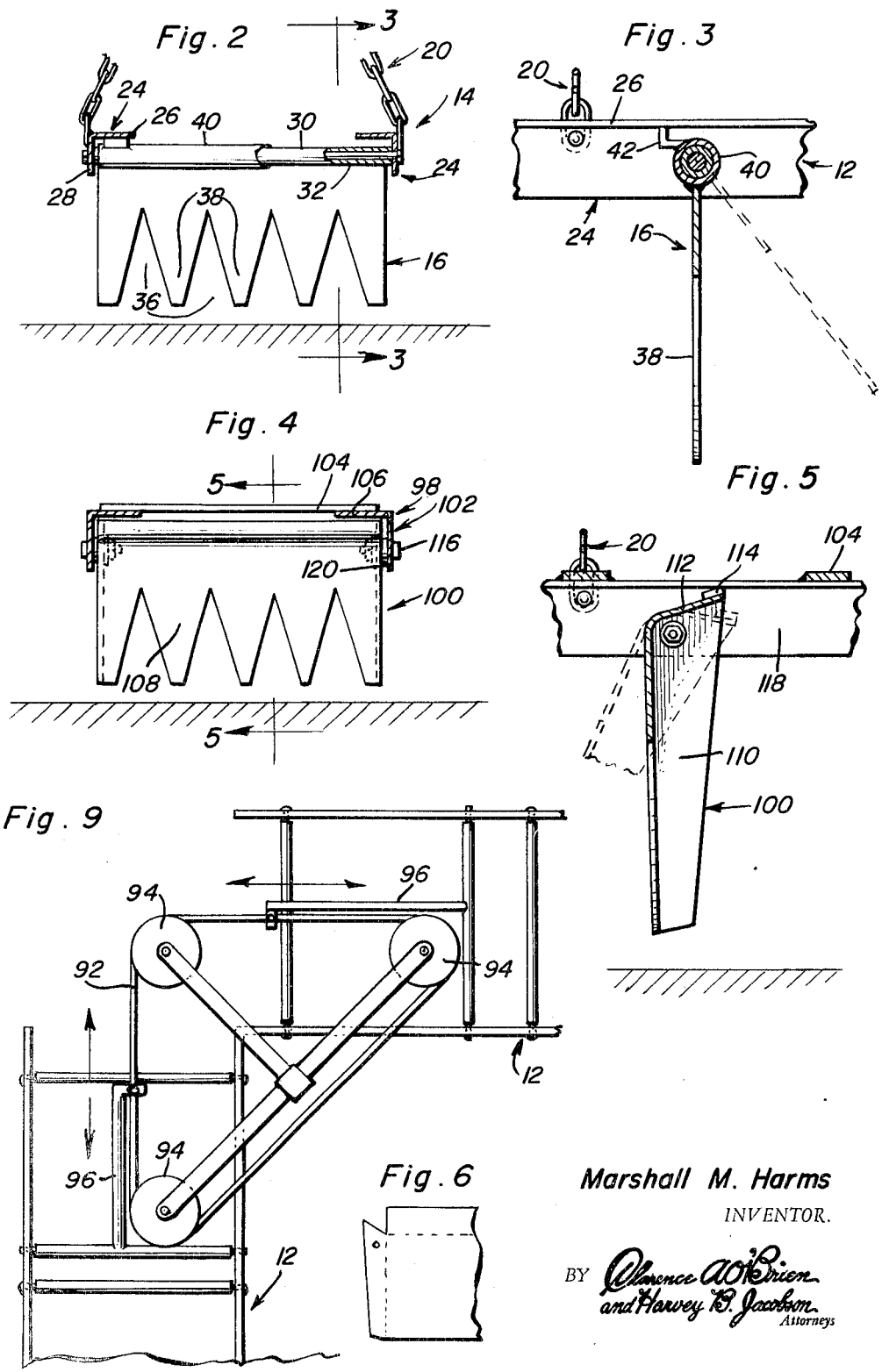

3,508,524
FEED MOVING APPARATUS
Marshall M. Harms, Walnut Hill, Fla.
(Star Rte. B, Box 468, Atmore, Ala. 36502)
Filed Jan. 25, 1968, Ser. No. 700,642
Int. Cl. A01k 5/02
U.S. Cl. 119—52    12 Claims

ABSTRACT OF THE DISCLOSURE

An elongated rectangular animal feed moving frame suspended by a plurality of flexible chains or cables which can be selectively extended or retracted so as to vary the height of the frame in an animal feed trough. The frame suspends a plurality of fork-like paddles which, upon a longitudinal swinging of the frame, engage the feed in the trough and effect a forward movement of the feed.

---

The instant invention is generally concerned with distributing apparatus for feed or like materials, and more particularly relates to feed moving apparatus uniquely adapted for utilization within feed bunks or troughs for the effective distribution of feed therealong.

It is a primary object of the instant invention to provide feed moving apparatus which can be suspended within a feed bunk and operatively driven in a simplified manner so as to effect a highly efficient distribution of feed along the full length of the bunk from a single point of introduction.

In conjunction with the above object, it is a significant object of the instant invention to provide feed distributing apparatus which can be easily adjusted so as to vary the amount of feed being distributed.

Further, it is an important object of the instant invention to provide apparatus which is capable of accommodating coarse material or feed without affecting the efficiency of the operation of the apparatus.

In addition, it is an object of the instant invention to provide feed moving apparatus which can be adapted to effect a complete distribution of feed along the length of a feed bunk regardless of the point at which the feed is introduced into the bunk.

Also, and of primary significance, is the fact that it is an object of the instant invention to provide apparatus which is quite simple in construction and incorporates economies in the structural features thereof which result in a highly practical unit, and at the same time a unit which is unique in comparison with apparatus heretofore used for effecting feed distribution.

Basically, in achieving the above objects, the apparatus of the instant invention includes a chain suspended reciprocally driven feed moving or conveying frame which in turn suspends a plurality of pivotally mounted fork-like paddles. The paddles, upon a forward movement of the frame, engage and forwardly move the feed or material, the paddles pivotally retracting upon a return movement of the frame. The suspended nature of the frame enables a vertical adjustment thereof so as to vary the amount of feed being distributed. Further, by reversing the position of certain ones of the paddles, the frame can be operated so as to distribute feed in both directions from a central feed introducing point. By the same token, it is also contemplated that a power transfer arrangement be provided should the distribution of feed in two angularly related troughs be desired as a continuous movement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the apparatus of the instant invention installed in operative position;

FIGURE 2 is an enlarged elevational view, with portions broken away for purposes of illustration, of a mounted paddle, taken substantially on a plane passing along line 2—2 in FIGURE 1;

FIGURE 3 is an enlarged cross-sectional view taken substantially on a plane passing along line 3—3 in FIGURE 2;

FIGURE 4 is an elevational view similar to FIGURE 2 of a modified form of feed moving paddle;

FIGURE 5 is an enlarged cross-sectional view taken substantially on a plane passing along line 5—5 in FIGURE 4;

FIGURE 6 is a partial plan view of a metal blank from which the paddle of FIGURES 4 and 5 is formed;

FIGURE 7 is an enlarged cross-sectional detail illustrating the manner in which the suspension chains are secured to the overhead pipe;

FIGURE 8 is a schematic illustration of an arrangement wherein feed is introduced at an intermediate point along the feed bunk; and FIGURE 9 is a schematic plan view illustrating an arrangement utilized when feed is to be moved continuously along angularly related trough sections.

Referring now more specifically to the drawings, reference numeral 10 is used to generally designate the over-all feed moving apparatus comprising the instant invention. This apparatus 10 includes the actual feed engaging and moving unit 12, including an elongated rectangular frame 14 and a plurality of depending paddles 16 associated therewith, the apparatus driving unit 18, and the suspension system, including suspension cables 20 and an overhead support rod 22.

It has been found that the most practical way to construct the frame 14, from the standpoint of economy and efficiency, is through the utilization of angle iron side rails 24 orientated in laterally spaced parallel relation to each other with the horizontal flanges 26 thereof inwardly directed in a common plane toward each other and with the vertical flanges 28 receiving a hollow spacing bar or pipe 30 therebetween at points corresponding to the proposed locations of the paddles 16. An elongated bolt 32 extends through each pipe 30 and the vertical rail flanges 28 so as to lock the opposed rails 24 into a rigid frame unit. Incidently, it will of course be appreciated that the opposite ends of the bolts 32 are to be provided with conventional bolt heads and/or nuts to enable the desired clamping of the side rails 24 to the intermediate spacing pipes 30. The opposite ends of the side rails 24 can, noting FIGURE 1, also be rigidly interconnected by transversely extending angular beams or rail sections 34 extending therebetween and welded thereto.

The paddles 16 are each formed of a rigid flat rectangular plate having relatively deep V-shaped notches 36 defined inward from the lower edges thereof so as to in turn define a plurality, normally five, and preferably at least three or more, depending teeth 38 which result in a fork-like configuration capable of accommodating and effectively moving even coarse feed such as silage or the like. Each of the paddles 16 includes an elongated pipe section 40 welded longitudinally along the upper edge thereof, this pipe section in turn being rotatably received over one of the frame bracing pipes 30 which acts in the nature of a bearing so as to enable a pivotal movement of the paddle 16 suspended therefrom. The paddle pipe section 40 will of course be of a length slightly less than that of the pipe member 30 so as to freely swing thereon without interference from the adjacent vertical rail flanges 28.

Further, as will be best appreciated from FIGURE 3, the member 30 is located sufficiently below the rail top flanges 26 so as to avoid an engagement between the paddle pipe section 40 with these flanges 26 during the desired pivotal movement of the paddle 16.

With continued reference to FIGURE 3, it will be noted that each paddle 16 is provided with a rigid stop 42 fixed preferably to the associated pipe section 40 with this stop 42 engaging against the undersurface of a horizontal side rail flange 26 so as to limit the pivotal swinging movement of the paddle to a vertical position during a forward movement of the feed moving or conveying unit 12 as indicated by the upper arrow in FIGURE 3. The paddle 16, however, will be able to freely pivot upwardly, as indicated in phantom lines in FIGURE 3, upon a return or rearward swinging of the frame and paddle unit 12 so as to ride smoothly over the feed and not effect a reverse movement thereof.

The longitudinal swinging movement of the frame 14 is made possible by the utilization of flexible suspension cables 20 which will preferably be in the nature of link chains. The upper end of each cable 20 is affixed to the overhead height adjusting pipe or member 22, in any suitable manner such as by the utilization of bolt means as detailed in FIGURE 7. The lower end of the suspension cable 20 is actually formed into two diverging cable links or portions 44 which are secured, as by bolting or the like, to the opposed frame rails 24 at longitudinally aligned points as will be readily appreciated from FIGURES 1 and 2.

The overhead bar or pipe 22 is in turn rotatably supported beneath the feed bunk roof by a plurality of longitudinally spaced bearings 46 affixed to and depending from the roof rafters 48 so as to rotatably position the pipe 22 immediately therebelow. The rotatable supporting of the pipe 22 enables a simultaneous vertical adjustment of the entire length of the unit 12 as the cables or chains 20 are wound on or unwound from the pipe 22 through a rotation thereof. The actual rotation of the pipe 22 can be effected in any convenient manner, either manually or automatically. One particular manner of effecting the desired rotation of the pipe 22 which has been found to be highly satisfactory has been illustrated in FIGURE 1. This consists basically of the provision of an enlarged rigid collar-like disk 50 about the pipe 22 at a convenient central location, this disk 50 being welded or otherwise permanently affixed to the pipe 22 and including a plurality of equally spaced apertures 52 in a circle thereabout. The disk 50 will normally be positioned adjacent one of the pipe suspending bearings 46 with this particular bearing 46 in turn mounting, through a depending bracket 54, a laterally sliding positioning or lockpin 56 which, through a sliding movement thereof, can be selectively engaged within or disengaged from an aligned one of the disk holes 52. Mounted to the other side of the disk 50 from the bracket mounted pin 56 is an elongated control rod 58 rotatably mounted about the pipe 50 through an appropriate bearing sleeve 60. This control rod 58 in turn mounts a laterally projecting finger 62 which, through a sliding movement of the bearing mounted rod 58 along the pipe 22 can be selectively engaged within or disengaged from an aligned one of the disk holes 52. Thus, when it becomes desirable to rotate the pipe 22 in effecting either a raising or lowering of the frame and paddle unit 12 so as to vary the amount of feed moved, the control pin 62 will, through a manipulation of the control rod or handle 58, be introduced into one of the openings 52, after which, still maintaining a hold on the handle 58, the positioning or lockpin 56 will be released and the disk 50, and thereby the pipe 22 itself, manually rotated through a swinging of the handle 58. Upon a swinging of the handle 58 sufficient so as to rotate the pipe 22 the desired amount, the positioning and lockpin 56 will be re-engaged with an aligned one of the openings 52 so as to lock the pipe 22, and hence the unit 12, in position, after which the control handle 58 can be released. Should a substantial degree of adjustment be desired, it will be appreciated that two or more repetitions of this sequence may be necessary.

The actual feed conveying movement of the frame and paddle unit 12 is effected through the unit 18 which includes, mounted within a housing enclosed support structure 64 affixed to the upper end of one or more pedestals 66 projecting upwardly from the base of the trough 68 immediately adjacent the frame 14, a power motor 69. The drive shaft 70 of the motor 69 projects outwardly therefrom and mounts, at the outer end thereof, a drive pulley 72 approximately centrally over the frame 14. A second gear 74 is rotatably mounted laterally of and in a common vertical plane with the gear 72 with an endless drive chain 76 being entrained about both gears 72 and 74 for travel in an endless path thereabout. A laterally projecting pin 78 is fixed to the chain 76 for movement thereabout and in turn pivotally mounts one end of an elongated rigid connecting rod 80. The remote end of the connecting rod 80, which parallels and overlies the frame 14, is pivotally secured to the frame 14 by an appropriate frame mounted saddle 82. The saddle 82 includes a transverse plate 84 extending between and rigidly welded or otherwise secured to the side rails 24, and a pair of laterally spaced upstanding mounting ears 86 which rotatably receive therebetween the transverse pipe-like member 88 affixed to the second or remote end of the connecting rod 80. In this manner, as the chain mounted pin 78 travels about the drive chain path, the frame 14, through the connecting rod 80, will swing longitudinally within the trough 68. As noted previously with regard to FIGURE 3, the paddles 16, on the forward or feed distributing stroke, will be maintained vertically by the associated stops 42. By the same token, on the return movement or stroke, the paddles 16 will pivot upwardly so as to smoothly slide over the feed without effecting a reverse movement thereof. This swinging movement is made possible by the flexible suspension members or cables 20. Further, due to the fixed length of the cables 20 regardless of the vertical adjustment thereof, it will be appreciated that the unit 12, during its return stroke, will tend to raise up, this in conjunction with the upward pivoting of the paddles 16 results in a substantial vertical elevation of the paddles 16 so as to ride smoothly rearwardly over the feed and subsequently, during the forward stroke, dig downwardly and forwardly into the feed in a manner contemplated to achieve a maximum bite into or engagement with the feed.

In order to assist the movement of the unit 12 during the feed distributing or forward moving stroke, an enlarged coiled tension spring 89 can be mounted between any suitable portion of the unit 18 and the adjoining side rail 24 of the frame 14 as illustrated in FIGURE 1. Further, as also suggested in FIGURE 1, it is contemplated that the drive chain pin 78 be so located as to produce a greater empty or reverse stroke than forward stroke thereby effecting a greater rise to the paddles 16 prior to the forward movement thereof. This can be effected during the initial installation of the apparatus by first freely suspending the frame unit 12 by the flexible suspension members 20 and subsequently mounting the drive chain pin 78 on the lower run of the chain 76 approximately two inches toward the drive sprocket or gear 72. Finally, it should be appreciated that the power assembly can include any appropriate type of speed reduction unit which might be deemed necessary so as to achieve the desired sequential movement at an appropriate speed contemplated to most effectively move the feed.

With the arrangement just described, the feed will be introduced into one end of the trough or feed bunk 68 through an appropriate chute 90 leading from a feed storage structure, with the reciprocating swinging of the unit 12 effecting, through the fork-like paddles 16, a progressive movement of the feed longitudinally along the full length of the feed bunk 68. As noted previously, the paddles 16 will simultaneously rise and pivot upwardly so as to freely slide over the feed during the empty or return stroke, and, upon commencing the forward or distributing stroke, fall or knife downwardly into the feed, assuming a vertical feed moving position which is maintained throughout the entire forward stroke. The amount of feed moved can be varied through an effective shortening or lengthening of the suspension cables 20, this being achieved, in the illustrated embodiment, through a rotatably mounted overhead shaft 22 upon which the suspension cables can be either wound or unwound.

At this point attention is directed to FIGURE 8 which schematically illustrates an arrangement whereby the feed can be introduced into the trough 68 from a centrally located chute 90. In this case, the paddles 16 to each side of the chute 90 are mounted in reverse relation to each other, that is so as to pivot in opposite directions. Thus, the movement of the frame and paddle unit 12 in a first direction will effect a conveying or movement of the feed to one side of the chute, while a return movement of the unit 12 will effect a corresponding movement of the feed to the opposite side of the chute 90 while the paddles to the first side of the chute ride smoothly over the previously moved feed. In this manner, the feed will only have to be moved, at a maximum, one half the length of the trough. As such, both strokes of the frame and paddle unit 12 will operate to move feed, providing for a greater moving capacity and a more balanced operation, with less power being expended. With this arrangement, that is the reversing of selected ones of the paddles, it will be appreciated that the feed can actually be introduced into a trough at any desired point along the length thereof.

Reference is now had to FIGURE 9 wherein a system for utilizing the apparatus of the instant invention in conjunction with a pair of angularly related trough sections has been set forth. Basically, a cable suspended frame and paddle unit 12 is located in each of the communicated troughs, one of these units 12 having a power unit 18 associated therewith for effecting the reciprocal movement thereof in the same manner as described supra. This movement is transmitted to the second and paddle unit 12 through an endless belt 92 engaged over three rotatably mounted pulleys 94 which provide a belt run paralleling each unit 12. Each unit 12 additionally includes a connecting rod 96 pivotally engaged between the unit 12 and the paralleling belt run to which it is fixed. Thus, assuming the upper unit 12 in FIGURE 9 has the power unit associated therewith, as this unit 12 is swung to the left, a pull is introduced into the belt 92 which is transmitted to the lower unit 12 through the belt mounted associated connecting rod 96. By the same token, upon a return swinging of the upper unit 12, a reverse pull is effected on the belt 92 which is also transmitted to the lower unit 12 through its connecting rod 96. In this manner, a synchronized swinging of the cable suspended lower unit 12 will be effected along with the power induced swinging movement of the upper unit 12.

Finally, attention is directed to FIGURES 4, 5, and 6 wherein a modified form of frame 98 and paddle 100 have been illustrated. The frame 98 differs from the frame 14 in that the laterally spaced angular side rails 102 are interconnected by transversely extending plates 104 overlying the horizontally aligned top rail flanges 106 with these plates 104 being rigidly affixed, preferably by welding. Each of the paddles 100 itself includes, in addition to the main fork-like feed moving transverse portion 108, a pair of rearwardly directed integral rigidifying or bracing side flanges 110 and an integral upwardly angled top flange 112 which terminates in a limit forming edge 114. This limit forming edge 114 operates in the same manner as the stop or limit 42 in limiting the pivotal movement of the paddle 100 on the forward stroke through engagement with the undersurface of the horizontal rail flanges 106. The actual pivotal mounting of the paddles 100 is effected by nutted bolts 116 extending through the vertical paddle flanges 110 and the adjacent side rail vertical flanges 118, appropriate bearing sleeves 120 also being utilized so as to provide for a free pivotal swinging of the paddles 100. With regard to the paddles 100, FIGURE 6 is of significance in illustrating a portion of the blank from which the paddle 100 is to be formed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Material moving apparatus for use in moving feed in an animal feed trough or the like for movement of feed material therealong, said apparatus comprising an overhead support, an elongated frame, fixed length swinging flexible suspension members affixed between said frame and said overhead support at longitudinally spaced points along said frame freely suspending said frame from and below said overhead support and constituting a means for providing longitudinal swinging movement and a corresponding vertical movement of said frame, means engaged with said frame for effecting a reciprocal longitudinal swing and vertical moving thereof, and material engaging and moving paddles mounted on and depending from said frame at longitudinally spaced points along said trough for movement longitudinally and vertically, therewith, said frame and paddles alternately swinging downwardly in a first material moving direction and upwardly in a second reverse direction.

2. The apparatus of claim 1 wherein said suspension members are in the nature of elongated cables.

3. The apparatus of claim 2 including means for selectively adjusting the length of said suspension members and fixing the suspension members at the adjusted length, thereby varying the vertical position of the frame.

4. The apparatus of claim 3 wherein said paddles are pivotally mounted on said frame for movement between a first vertical material moving position assumed upon a swinging of the frame in said first direction, and a second vertically elevated and upwardly pivoted empty position upon a swinging of the frame in said second direction reverse from said first direction.

5. The apparatus of claim 4 wherein said frame comprises a pair of angle member side rails orientated in parallel laterally spaced relation to each other, each side rail including a horizontal flange inwardly directed toward a generally coplanar similar horizontal flange on the second rail, and a vertical flange integral with the outer edge of the horizontal flange, and rigid transverse bracing means affixed between said rails at longitudinally spaced points therealong, said paddle extending between and being pivotally affixed to said side rails, and limit means on said paddles selectively engaged with the horizontal flanges to define said first material moving position.

6. The apparatus of claim 5 wherein said bracing means are in the nature of cylindrical members engaged with the opposed vertical flanges, each paddle including an elongated pipe section affixed longitudinally along the upper edge thereof, said pipe section being rotatably received over one of said bracing means for pivotally suspending said paddle therefrom.

7. The apparatus of claim 6 wherein the paddles to the opposite sides of a predetermined point along a straight length of the frame are mounted for pivotal movement in opposite directions whereby the paddles to one side will move to said first position while the paddles to the other side move to the second position, and vice versa, thereby enabling an intermediate loading of the trough and a movement of material to the opposite sides thereof.

8. The apparatus of claim 2 including a second suspended swinging frame located at an angle to the first-mentioned frame with one end adjacent to one end of the first frame, and means engaged directly between these adjacent ends of said frames for transferring a positive alternating force to said second frame from said first frame for effecting a synchronized back and forth swinging movement of the second frame in response to and in conjunction with the swing of the first-mentioned frame.

9. The apparatus of claim 1 wherein said paddles are pivotally mounted on said frame for movement between a first vertical material moving position assumed upon a swinging of the frame in said first direction, and a second vertically elevated and upwardly pivoted empty position upon a swinging of the frame in said second direction reverse from said first direction.

10. The apparatus of claim 9 wherein said frame comprises a pair of angle member side rails orientated in parallel laterally spaced relation to each other, each side rail including a horizontal flange inwardly directed toward a generally coplanar similar horizontal flange on the second rail, and a vertical flange integral with the outer edge of the horizontal flange, and rigid transverse bracing means affixed between said rail vertical flanges at longitudinally spaced points therealong, said bracing means being in the nature of cylindrical members, each paddle including an elongated pipe section affixed longitudinally along the upper edge thereof, said pipe section being rotatably received over one of said bracing means for pivotally suspending said paddle therefrom, and limit means on said paddles selectively engaged with the horizontal flanges to define said first material moving position.

11. The apparatus of claim 9 wherein the paddles to the opposite sides of a predetermined point along a straight length of the frame are mounted for pivotal movement in opposite directions whereby the paddles to one side will move to said first position while the paddles to the other side move to the second position, and vice versa, thereby enabling a central loading of the trough and a movement of material to the opposite sides thereof.

12. The apparatus of claim 8 wherein the means for effecting a synchronized movement of the second frame with the first frame comprises a rigid connecting rod engaged with each of the frames at the said one end thereof and extending longitudinally of the corresponding frame, three coplanar pulleys rotatably mounted over the adjacent frame ends and an endless belt engaged over the three pulleys in a manner so as to provide a belt run paralleling each frame, the belt runs being fixed to the connecting rod of the corresponding frame whereby a movement of the first-mentioned frame in either direction will transmit a pull through the endless belt to the second frame for effecting a synchronized movement thereof.

References Cited
UNITED STATES PATENTS

| | | | |
|---|---|---|---|
| 512,817 | 6/1894 | Rice | 68—158 |
| 2,085,494 | 6/1937 | Ferry | 198—223 X |
| 2,130,082 | 9/1938 | Ferry | 198—223 X |
| 3,030,877 | 4/1962 | McDuffie et al. | 198—223 X |
| 1,011,321 | 12/1911 | Clark | 198—224 X |
| 2,467,988 | 4/1949 | Petraske | 198—224 |
| 2,523,700 | 9/1950 | Kribs | 119—102 |
| 2,681,132 | 6/1954 | Knutson | 198—224 X |
| 3,033,348 | 5/1962 | Andrew | 198—224 X |
| 3,225,742 | 12/1965 | Hagans | 119—56 X |

ALDRICH F. MEDBERY, Primary Examiner

U.S. Cl. X.R.

198—223